(12) United States Patent
Kim et al.

(10) Patent No.: US 7,327,771 B2
(45) Date of Patent: Feb. 5, 2008

(54) WDM-PON SYSTEM WITH OPTICAL WAVELENGTH ALIGNMENT FUNCTION

(75) Inventors: Byoung Whi Kim, Daejeon (KR); Jae Dong Park, Daejeon (KR); Hyeong Ho Lee, Daejeon (KR); Jae Woo Yang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 524 days.

(21) Appl. No.: 10/970,348

(22) Filed: Oct. 20, 2004

(65) Prior Publication Data

US 2005/0129402 A1    Jun. 16, 2005

(30) Foreign Application Priority Data

Oct. 21, 2003  (KR) .................. 10-2003-0073448
Sep. 9, 2004   (KR) .................. 10-2004-0072041

(51) Int. Cl.
*H01S 3/03* (2006.01)

(52) U.S. Cl. .................. 372/64; 372/50.1; 372/50.11; 398/79

(58) Field of Classification Search ........ 372/64, 372/50.1, 50.11; 398/79
See application file for complete search history.

(56) References Cited

U.S. PATENT DOCUMENTS 6,101,210 A * 8/2000 Bestwick et al. ........... 372/96
6,236,773 B1  5/2001 Butler et al.
6,807,204 B1 * 10/2004 O'Dowd ...................... 372/32
6,975,812 B1 * 12/2005 Kuhara et al. ............... 398/21

FOREIGN PATENT DOCUMENTS

KR    1020030063085    7/2003

* cited by examiner

*Primary Examiner*—Dung (Michael) Nguyen
(74) *Attorney, Agent, or Firm*—Blakely, Sokoloff, Taylor & Zafman

(57) ABSTRACT

A PLC-based wavelength-tunable WDM-PON system with an optical wavelength alignment function, the WDM-PON system comprises: a PLC platform formed on a silicon substrate; a semiconductor chip comprising an active region generating light and a passive region located in front of the active region for vertically coupling the light generated in the active region; a planar lightwave circuit (PLC) waveguide; one portion of a PLC platform where the semiconductor chip is surface mounted; waveguide Bragg grating (WBG) formed at a predetermined location of the PLC waveguide; a directional coupler transferring an optical power by permitting the passive region to approach the PLC waveguide; a heater terminal, which is formed on the WBG; and a V-groove for attaching an optical fiber to another end of the PLC waveguide. Accordingly, a WDM-PON system having a function of realizing a cost-effective optical wavelength alignment can be provided.

15 Claims, 15 Drawing Sheets

WDM-PON SYSTEM WITH OPTICAL WAVELENGTH ALIGNMENT FUNCTION

BACKGROUND OF THE INVENTION

This application claims the priority of Korean Patent Applications No. 2003-73448, filed on Oct. 21, 2003 and No. 2004-72041, filed on Sep. 9, 2004, in the Korean Intellectual Property Office, the disclosures of which are incorporated herein in their entirety by reference.

1. Field of the Invention

The present invention relates to a wavelength division multiplexing passive optical network (WDM-PON) system, and more particularly, to a WDM-PON with an optical wavelength alignment function for maintaining optical communication links regardless of an ambient temperature change.

2. Description of the Related Art

The variation of optical characteristics of modules included in a WDM-PON caused by a temperature change must be essentially considered in the WDM-PON.

In particular, since optical devices in a subscriber premises are exposed to the variance of ambient temperature in a subscribers network and the ambient temperature is different according to places in which the optical devices are installed, if this environment is not considered properly, optical communication quality cannot be satisfied. Therefore, a method of cost-effective solution with which a good quality of optical communications can be maintained regardless of the variance of ambient temperature in a WDM-PON system has been suggested.

That is, when a conventional WDM-PON system is applied to an actual environment, a WDM-PON system maintaining stable optical communication channels regardless of the variance of ambient temperature is required. Accordingly, a structure of stable and cost-effective optical communication links is required.

SUMMARY OF THE INVENTION

The present invention provides a wavelength division multiplexing passive optical network (WDM-PON) system with an optical wavelength alignment function for maintaining a good quality of optical communication links regardless of a temperature change.

The present invention also provides wavelength-tunable laser diodes (LDs) whose output optical wavelengths are tunable so that light sources of an optical transmitter of an optical line terminal (OLT) can be adapted to wavelength variations generated by the variance of ambient temperature of a WDM multiplexer/demultiplexer (MUX/DMX) located near subscribers.

The present invention also provides wavelength-tunable optical power monitor (OPM)-LDs formed in an optical transmitter and an optical receiver of an OLT in order to sense wavelength variations generated by the variance of ambient temperature of a WDM MUX/DMX located near subscribers and properly manage the wavelength variations.

The present invention also provides an optical transmitter of an ONT whose output optical wavelength is matched to a wavelength of a WDM MUX/DMX located near subscribers according to the variance of ambient temperature without an additional light source.

According to an aspect of the present invention, there is provided a wavelength division multiplexing passive optical network (WDM-PON) system with an optical wavelength alignment function, the WDM-PON system comprising: an optical line terminal (OLT) composed of an optical transmitter, which is composed of an OLT-LD array generating optical wavelengths for data transmission and a first wavelength control circuit aligning wavelengths of downstream transmission channels against variations of ambient temperatures, and an optical receiver, which is composed of a photo diode (PD) array and a second wavelength control circuit aligning a wavelength of an upstream transmission line against variations of ambient temperatures, wherein the optical transmitter further comprises a first WDM multiplexer (MUX) multiplexing a plurality of optical wavelengths output from the OLT-LD array and the optical receiver further comprises a first WDM demultiplexer (DMX) receiving a multiplexed optical wavelength and dividing the input multiplexed optical wavelength into individual wavelengths; a plurality of optical network terminals (ONTs), each ONT comprising an optical receiver, which receives a downstream optical wavelength for data transmission transmitted from the optical transmitter of the OLT, and an optical transmitter in which a wavelength-tunable waveguide Bragg grating (WBG) is formed, which forms an external cavity laser (ECL) generating a wavelength-tunable optical wavelength by controlling a temperature applied to the wavelength-tunable WBG; a second WDM DMX, which is located in a main distribution frame (MDF) placed near the plurality of ONTs, divides multiplexed optical wavelengths transmitted from the first WDM MUX via optical fiber into individual optical wavelengths, connects each optical wavelength to a relevant ONT of the plurality of ONTs, and has a first OPM-reflection mirror (RM) port reflecting an optical wavelength transmitted from the first wavelength control circuit; and a second WDM MUX, which is located in the MDF placed near the plurality of ONTs, multiplexes a plurality of optical wavelengths output from optical transmitters of the plurality of ONTs, transmits the multiplexed optical wavelengths to the first WDM DMX of the OLT via optical fiber, has a second OPM-RM port reflecting an output optical wavelength of the OPM-LD transmitted from the second wavelength control circuit, and has a WDM-RM port reflecting optical wavelengths to the optical transmitters of the ONTs according to how an optical wavelength output from the optical transmitter of an ONT is mismatched to a corresponding pass band of the second WDM MUX.

According to another aspect of the present invention, there is provided a PLC-based wavelength-tunable WDM-PON system with an optical wavelength alignment function, the WDM-PON system comprising: a PLC platform; a semiconductor chip comprising an active region generating light and a passive region located in front of the active region using a directional coupling principle for vertically coupling the light generated in the active region to another waveguide; a planar lightwave circuit (PLC) waveguide is formed on the PLC platform, and in one portion of which a PLC platform semiconductor chip is surface mounted by a passive alignment method, and at a predetermined location of PLC waveguide a waveguide Bragg grating (WBG) is formed; a directional coupler transferring an optical power by permitting the passive region to approach the PLC waveguide; a heater terminal, which is formed on the WBG in order to control a temperature of the WBG; and a V-groove, which is formed on the PLC platform for attaching an optical fiber into the end of the PLC waveguide.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which embodiments of the invention are shown.

Figure 1A:
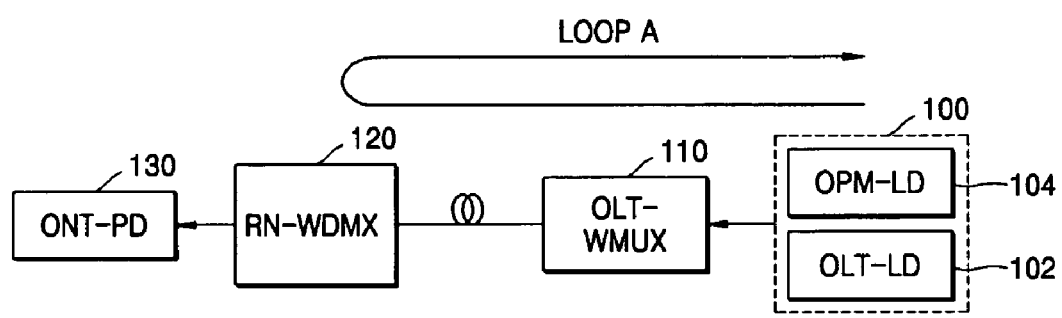
FIGS. 1A and 1B are schematic block diagrams of a WDM-PON system with an optical wavelength alignment function responding to a temperature change according to an embodiment of the present invention.
Figure 1B:
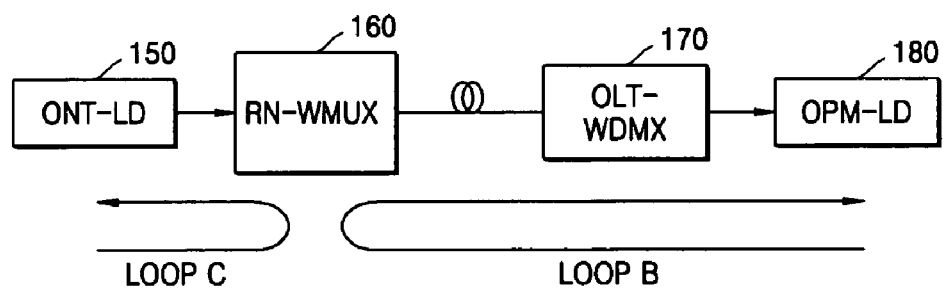

FIGS. 1A and 1B are schematic block diagrams of a wavelength division multiplexing passive optical network (WDM-PON) system with an optical wavelength alignment function responding to a temperature change according to an embodiment of the present invention.

FIGS. 1A and 1B show configuration modules whose optical wavelengths are changed in response to a temperature change in a structure of the WDM-PON and a loop A, a loop B, and a loop C for matching the optical wavelengths of the configuration modules.

FIG. 1A shows a downstream transmission line directing from a central office (CO) to a subscriber. The downstream transmission line includes an optical line terminal (OLT) optical transmission module 100 composed of an OLT-laser diode (OLT-LD) module 102 for data transmission and an optical power monitor (OPM)-LD 104, which is added to align wavelengths of the downstream transmission channels in response to a temperature change, an OLT-WDM multiplexer (WMUX) 110 located in an OLT, a remote node (RN)-WDM demultiplexer (WDMX) 120 located near the subscriber, and an optical network terminal-photo detector (ONT-PD) 130, which is a subscriber optical reception module.

Components whose center optical wavelengths are changed due to the temperature change in the downstream transmission line are the OLT transmission module 100, the OLT-WMUX 110, and the RN-WDMX 120. Here, according to conventional installation of the PON, the RN-WDMX 120 is exposed to the variance of ambient temperature most severely, and an electric device for controlling the temperature is not equipped in the RN-WDMX 120. Therefore, a wavelength change of the RN-WDMX 120 can be taken as the reference for the other components, and the OLT transmission module 100 and the OLT-WMUX 110 align their wavelengths with reference to the changed wavelength of the RN-WDMX 120.

FIG. 1B shows an upstream transmission line directing from the subscriber to the CO. The upstream transmission line includes an ONT-LD 150, which is a subscriber optical transmission module, an RN-WMUX 160 located near the subscriber, an OLT-WDMX 170 located in the OLT, and an OPM-LD 180, which is added to align a wavelength of the upstream transmission channels in response to a temperature change.

Components whose center optical wavelengths are changed due to the temperature change in the upstream transmission line are the ONT-LD 150, the RN-WMUX 160, the OLT-WDMX 170, and the OPM-LD 180. Here, like the downstream transmission line, the RN-WMUX 160 is exposed to the variance of ambient temperature most severely according to characteristics of the PON, and an electric device for controlling the temperature is not equipped in the RN-WMUX 160. Therefore, a wavelength change of the RN-WMUX 160 is referred to the other components, and the ONT-LD 150 aligns its wavelength with reference to the changed wavelength of the RN-WMUX 160. Also, in a separate way from the ONT-LD 150, the OLT-WDMX 170 and the OPM-LD 180 align their wavelengths with reference to the changed wavelength of the RN-WMUX 160.

The wavelength alignment of the downstream transmission line is performed through the loop A. That is, the variance of the center wavelength of the RN-WDMX 120 is sensed by emitting a beam for a wavelength change measurement from the OPM-LD 104 to the RN-WDMX 120 and measuring the intensity of the beam reflected at the RN-WDMX 120, and the OLT transmission module 100 aligns its wavelength with reference to the sensed variance of the center wavelength of the RN-WDMX 120.

The wavelength alignment of the upstream transmission line is independently performed through the loop B and the loop C. That is, the wavelength alignment of the ONT-LD 150 is performed through the loop C. A misalignment of the RN-WMUX 160 is sensed by outputting an optical wavelength for data transmission from the ONT-LD 150 to the RN-WMUX 160 and measuring the intensity of an optical signal reflected at the RN-WMUX 160, and the ONT-LD 150 aligns its wavelength with reference to the changed wavelength of the RN-WMUX 160. Also, the wavelength alignment of the OLT-WDMX 170 and the OPM-LD 180 is performed through the loop B. That is, a misalignment of the RN-WMUX 160 is sensed by emitting a beam for a wavelength change measurement from the OPM-LD 180 to the RN-WMUX 160 and measuring the intensity of the beam reflected at the RN-WMUX 160, and the OLT-WDMX 170 and the OPM-LD 180 align their wavelengths with reference to the changed wavelength of the RN-WMUX 160.

Figure 2:
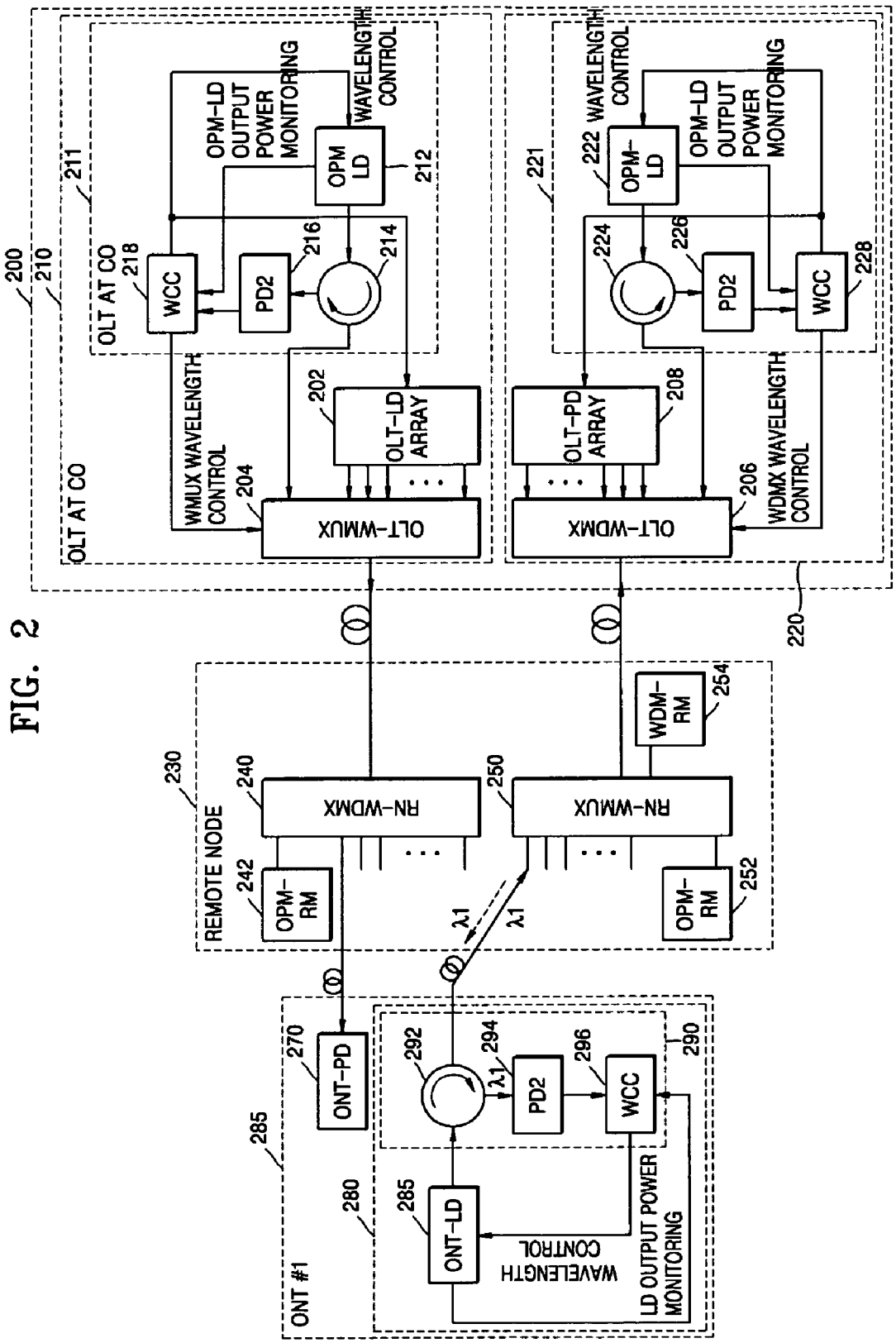
FIG. 2 is a block diagram illustrating a logical structure of a WDM-PON system according to an embodiment of the present invention.

FIG. 2 is a block diagram illustrating a logical structure of a WDM-PON system according to an embodiment of the present invention.

A basic operation of the WDM-PON system will now be described with reference to FIG. 2. An OLT 200 located at a CO includes an optical transmitter 210 of a multi-wavelength external cavity laser (ECL) array type and an optical receiver 220 of a PD array type.

An ONT 260 includes an optical transmitter 280 including an ECL based on a broadband-tunable waveguide Bragg grating (WBG) and an optical receiver (ONT-PD) 270.

The optical transmitter 210 of the OLT 200 further includes an OLT-WMUX 204 multiplexing a plurality of optical wavelengths output from the ECL array, and the optical receiver 220 of the OLT 200 further includes an OLT-WDMX 206 demultiplexing a multiplexed optical wavelength input from a plurality of ONTs 260 into wavelengths.

A multiplexed wavelength output from the optical transmitter 210 of the OLT 200 is transmitted via an optical fiber, divided into individual wavelengths by an RN-WDMX 240 located near subscribers, and transferred to the ONTs 260. Different optical wavelengths output from the ONTs 260 are multiplexed by an RN-WMUX 250 located near the subscribers and transferred to the optical receiver 220 of the OLT 200 via an optical fiber.

The ONT 260 includes the ECL of an individual component type including a Fabry Perot laser diode (FP-LD) and a WBG in a same way with the OLT 200. The important feature of the ECL is to generate all the optical wavelengths used in the OLT optical transmitter and to be not related to a specific optical wavelength since a center wavelength of a WBG reflection band can vary in a wide optical wavelength range by a heater.

Referring to FIG. 2, the optical transmitter 210 of the OLT 200 basically includes an OLT-LD array 202 emitting beams at frequency spaces recommended by ITU-T. Multi-wavelength optical signals output from the OLT-LD array 202 are multiplexed by the OLT-WMUX 204 and transmitted via a downstream optical transmission line. Since the OLT-WMUX 204 receives n LD output optical wavelengths for data transmission from the OLT-LD array 202 and an optical wavelength from an OPM-LD 212 and multiplexes the (n+1) optical wavelengths, the OLT-WMUX 204 has a (n+1)×1 structure. An optical circulator 214 is located between the OPM-LD 212 and the OLT-WMUX 204. The optical circulator 214 transfers to a PD2 216 an OPM beam returning after the OPM beam is output from the OPM-LD 212 and is reflected at an OPM-RM 242 of the RN-WDMX 240. A wavelength control circuit (WCC) 218 receives electric powers of the PD2 216 and a monitor PD (mPD) included in the OPM-LD 212 and controls a wavelength of the OLT-WMUX 204, wavelengths of the OLT-LD array 202, and a wavelength of the OPM-LD 212. The WCC 218 also monitors a connection status of the downstream optical transmission line. A reference number 211 indicates a wavelength control circuit.

The optical receiver 220 of the OLT 200 includes an OLT-PD array 208 composed of n PDs and the OLT-WDMX 206. The OLT-WDMX 206 has a (n+1)×1 structure to divide an input multiplexed optical wavelength into n optical wavelengths and transmit a beam output from an OPM-LD 222 to the subscribers. An optical circulator 224 is located between the OPM-LD 222 and the OLT-WDMX 206. The optical circulator 224 transfers to a PD2 226 an OPM beam returning after the OPM beam is output from the OPM-LD 222 and reflected at an OPM-RM 252 of the RN-WMUX 250. A WCC 228 receives electric powers of the PD2 226 and a monitor PD (mPD) included in the OPM-LD 222 and controls wavelengths of the OLT-WDMX 206 and a wavelength of the OPM-LD 222. The WCC 228 also monitors a connection status of the upstream optical transmission line. A reference number 221 indicates a wavelength control circuit.

Since the RN-WDMX 240 includes n output ports for dividing a multiplexed optical wavelength input from the optical transmitter 210 of the OLT 200 into individual optical wavelengths and transmitting the optical wavelengths to the ONTs 260 and a port connected to the OPM-RM 242 reflecting an optical wavelength input from the OPM-LD 212, the RN-WDMX 240 has a (n+1)×1 structure.

Different optical wavelengths on which upstream data outputs from the ONTs 260 are loaded are multiplexed by the RN-WMUX 250 and transferred to the OLT-WDMX 206 via the upstream optical transmission line. An optical circulator 292 is located between an ONT-LD 285 and the RN-WMUX 250. The optical circulator 292 transfers to a PD2 294 a beam returning after the beam is output from the ONT-LD 285 and is reflected at a WDM-RM 254 of the RN-WMUX 250. A WCC 296 receives electric powers of the PD2 294 and a monitor PD (mPD) included in the ONT-LD 285 and controls a wavelength of the ONT-LD 285.

Since the RN-WMUX 250 includes n input ports for receiving optical wavelengths output from n ONT-LDs 285, the OPM-RM 252 reflecting an optical wavelength input from the OPM-LD 222 in the optical receiver 220 of the OLT 200, and the WDM-RM 254 reflecting an optical power to a relevant ONT 260 according to how much optical wavelengths output from individual ONT-LDs 285 are mismatched to corresponding wavelengths of the RN-WMUX 250, the RN-WMUX 250 has a (n+1)×2 structure.

Methods of aligning optical wavelengths in the entire network in response to the variance of ambient temperature will now be described in detail.

1) In a PON type network, it can be assumed that the RN-WMUX 250 is a passive device working without electricity and is exposed to the variance of ambient temperature. Since wavelengths (or pass bands) of the RN-WMUX 250 varies according to the variance of ambient temperature, an optical wavelength output from the ONT-LD 285 is generally mismatched to a center wavelength of the RN-WMUX 250 when one ONT 260 trys to communicate, and the intensity of a beam reflected at the WDM-RM 254 of the RN-WMUX 250 varies according to a degree of the mismatch. The reflection beam reflected at the WDM-RM 254 and input to the optical transmitter 280 of the ONT 260 can be generally regarded as the upstream optical signal output from the ONT 260, which tried to communicate, since a probability that a plurality of ONTs 260 simultaneously start to communicate is extremely low and some of ONTs 260 under communication have already aligned their output optical wavelengths of ONT-LDs 285 with corresponding wavelengths of the RN-WMUX 250. Therefore, the WCC 296 of the ONT 260, which just starts to communicate, compares the intensity of a reflected optical power input from the PD2 294 with an emitted optical power input from the mPD included in the ONT-LD 285, and an optical wavelength of the ONT 260 is aligned by matching the optical wavelength of the ONT-LD 285 to the wavelength of the RN-WMUX 250 according to the comparison results.

2) The WDM-RM 254 of the RN-WMUX 250 reflects an optical power toward the optical transmitter 280 of the ONT 260 in proportion to how much optical wavelengths input to the n input ports of the RN-WMUX 250 are mismatched to corresponding wavelengths of the RN-WMUX 250. The RN-WMUX 250 is formed so that an OPM-LD optical signal input from the OLT 200 passes at a minimized level toward the optical transmitter 280 of the ONT 260 via the n input ports of the RN-WMUX 250.

3) The OPM-LD 212 included in the optical transmitter 210 of the OLT 200 transmits an OPM beam via the OLT-WMUX 204 downward. This OPM beam is reflected at the OPM-RM 242 attached to the RN-WDMX 240 and returns to the optical transmitter 210 of the OLT 200. At this time, the intensity of the reflection beam of the OPM-RM 242 is determined according to a degree of mismatch between a wavelength of the RN-WDMX 240 changed by the ambient temperature and a wavelength of the OPM-LD 212, and the reflection beam is input to the PD2 216 via the optical circulator 214. The WCC 218 compares an output signal of the mPD included in the OPM-LD 212 with an output signal of the PD2 216 and controls the OLT-WMUX 204, the OLT-LD array 202, and the OPM-LD 212 so that wavelengths of the OLT-WMUX 204, wavelengths of the OLT-LD array 202, and a wavelength of the OPM-LD 212 are aligned to the wavelengths of the RN-WDMX 240.

Also, the WCC 218 manages a status of the downstream optical transmission line on the basis of the signals output from the mPD included in the OPM-LD 212 and the PD2 216.

4) Similarly, the OPM-LD 222 included in the optical receiver 220 of the OLT 200 transmits an OPM beam to the RN-WMUX 250 via the OLT-WDMX 206 and the upstream optical transmission line. This OPM beam is reflected at the OPM-RM 252 attached to the RN-WMUX 250 and returns to the optical receiver 220 of the OLT 200. At this time, the intensity of the reflection beam of the OPM-RM 252 is determined according to a degree of mismatch between a wavelength of the RN-WMUX 250 changed by the ambient temperature and a wavelength of the OPM-LD 222, and the reflection beam is input to the PD2 226 via the optical circulator 224. The WCC 228 compares an output signal of the mPD included in the OPM-LD 222 with an output signal of the PD2 226 and controls the OLT-WDMX 206 and the OPM-LD 222 so that wavelengths of the OLT-WDMX 206 and a wavelength of the OPM-LD 222 are aligned to the wavelengths of the RN-WMUX 250.

Also, the WCC 228 manages a status of the upstream optical transmission line on the basis of the signals output from the mPD included in the OPM-LD 222 and the PD2 226.

Figure 3:
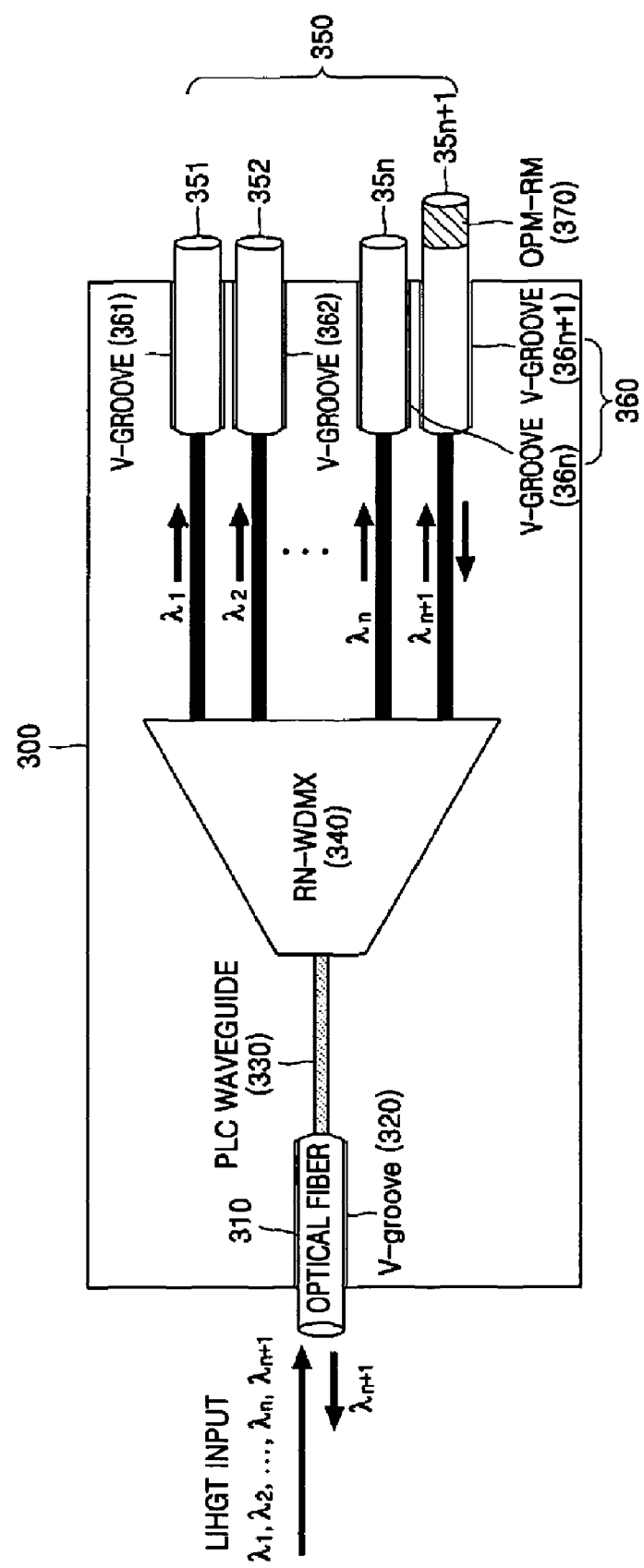
FIG. 3 is a schematic diagram of an RN-WDMX of FIG. 2.

FIG. 3 is a schematic diagram of the RN-WDMX 240 of FIG. 2. The RN-WDMX 240 has a 1×(n+1) ports structure.

Referring to FIG. 3, it is assumed that a wavelength output from the OPM-LD 212 of the OLT 200 is $\lambda_{n+1}$. An OPM-RM 370 exists at an output port of an RN-WDMX 340 from which a $\lambda_{n+1}$ signal is output and reflects the $\lambda_{n+1}$ signal. The OPM-RM 370 may be realized by configuring a mirror at a terminal of a relevant port using dielectric multi-layer coating or metal coating. Also, the OPM-RM 370 may be realized by optically connecting a discrete component such as a Bragg-reflector or a bulk mirror.

An arrayed-waveguide grating or a WDM filter can be used for a structure of the RN-WDMX 340.

Figure 4:
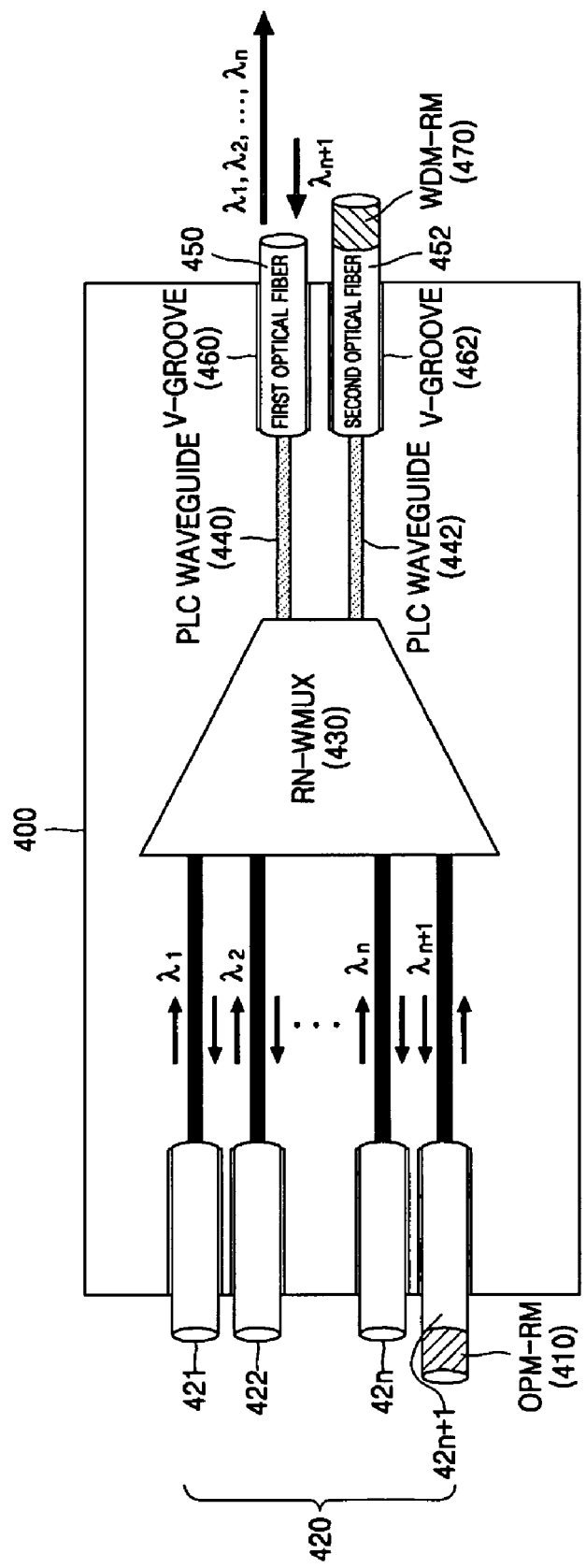
FIG. 4 is a schematic diagram of an RN-WMUX of FIG. 2.

FIG. 4 is a schematic diagram of the RN-WMUX 250 of FIG. 2. The RN-WMUX 250 is composed of a 2×(n+1) WDM MUX.

Referring to FIG. 4, it is assumed that a wavelength output from the OPM-LD 222 of the OLT 200 is $\lambda_{n+1}$ and wavelengths output from the ONTs 260 are $\lambda_1, \lambda_2, \ldots, \lambda_n$. OPM-RM 410 exists in a relevant port 42n+1 of an RN-WMUX 430 from which a $\lambda_{n+1}$ signal is output and reflects the $\lambda_{n+1}$ signal. Also, a WDM-RM 470 exists at a terminal of a second optical fiber 452 through which a multiplexed wavelength is output and reflects all of $\lambda_1, \lambda_2, \ldots, \lambda_n$ signals. A first optical fiber 451 through which the multiplexed wavelengths are output forms the upstream optical transmission line. Considering an optical loss, a least optical signal is transferred to the second optical fiber 452 by putting at least 1 diffraction order difference between the two optical fibers 451 and 452 when the RN-WMUX 250 is designed.

Here, a reflection mirror component, such as the OPM-RM 410 and the WDM-RM 470, may be realized by configuring a mirror at a terminal of a relevant port using dielectric multi-layer coating or metal coating. Also, the reflection mirror component, such as the OPM-RM 410 and the WDM-RM 470, may be realized by optically connecting a discrete component such as the Bragg-reflector or the bulk mirror.

The arrayed-waveguide grating or the WDM filter can be used for a structure of the RN-WMUX 430.

Figure 5A:
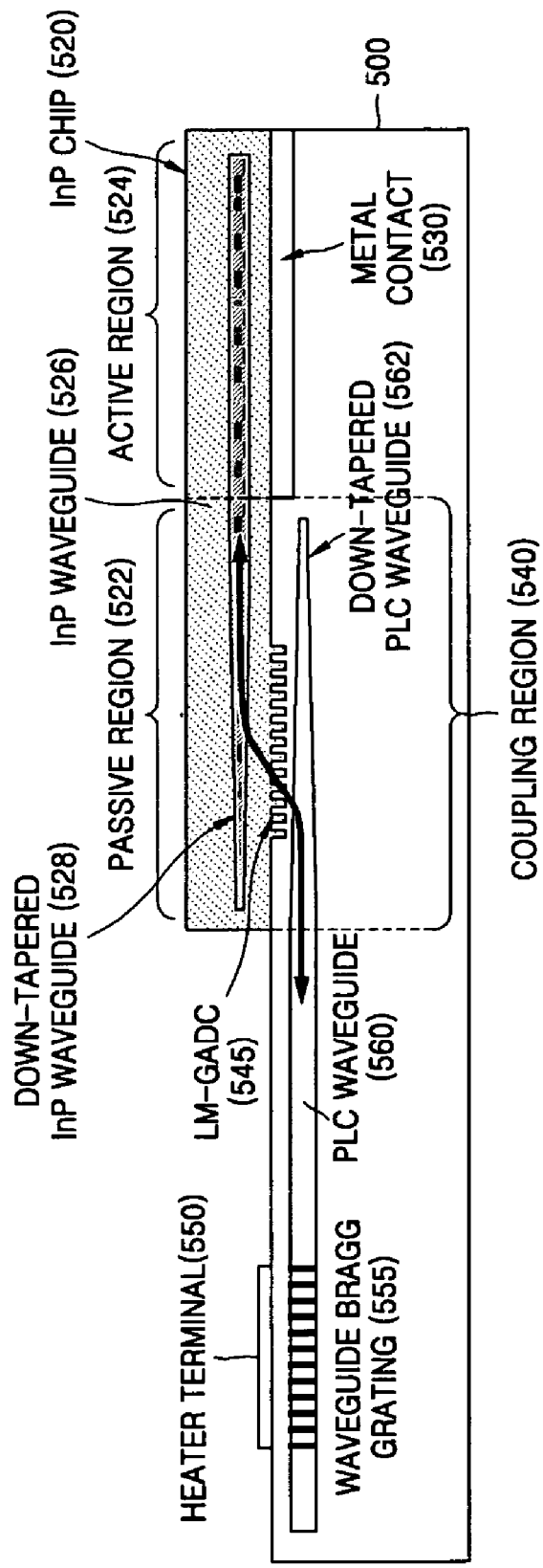
FIGS. 5A and 5B are side views of ECLs, wavelengths of which are tunable by changing temperature, based on a PLC.
Figure 5B:
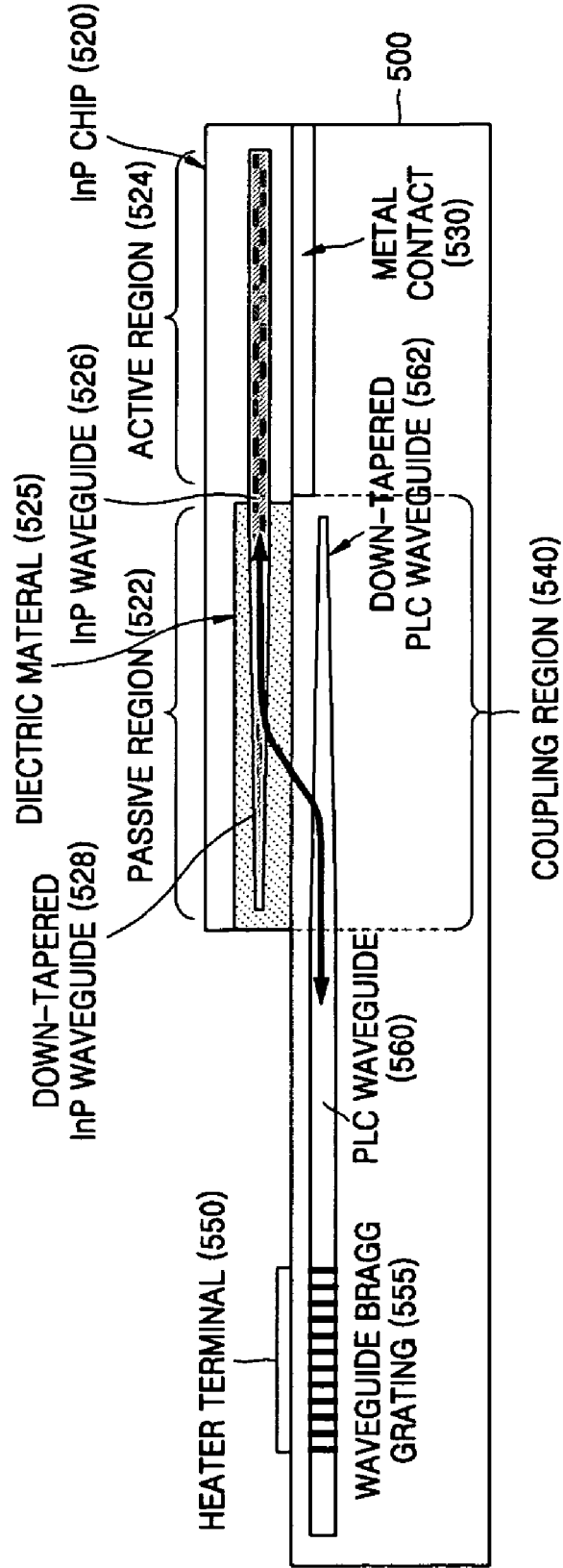

FIGS. 5A and 5B are side views of ECLs, wavelengths of which are tunable by changing temperature, based on a PLC.

Referring to FIG. 5A, unlike a conventional butt coupling method of directly coupling an active region 524 of an InP chip 520 generating light and a WBG 555 on a straight line, the active region 524 and the WBG 555 exist on different waveguides and are vertically coupled. FIG. 5A shows an ECL structure of changing an output optical wavelength by changing a temperature of the WBG 555 using a thermo-optic effect.

The InP chip 520 includes the active region 524 and a passive region 522 located in front of the active region 524 to vertically couple a generated beam to another waveguide. A semiconductor (InP family), a polymer, a nitride substance, or a silica can be used for the passive waveguide 526, and a channel waveguide, a ridge-loaded waveguide, or a rib-waveguide can be used as a waveguide structure.

The InP chip 520 is formed on an InP substrate and surface-mounted on a PLC platform using a low price passive alignment method such as a flip-chip bonding.

In order to make efficient optical coupling of a beam generated in the active region 524 to a PLC waveguide 560, the InP waveguide 526 has a structure that the size of the Passive waveguide 526 is getting smaller away from the active region 524, so called a down-tapered Passive waveguide structure 528. Also, the passive region 522 is formed so that a beam generated in the active region 524 is transferred to the PLC waveguide located 560 beneath or lost to the outside before the beam reaches the end of the Passive waveguide 526 in order to prevent the beam from being reflected at the end of the Passive waveguide 526 and input to the active region 524 again.

The PLC waveguide 560 also has a down-tapered PLC waveguide structure 562 so that size of a transferred beam gets larger in order to increase coupling efficiency between the PLC waveguide and Passive waveguide, and also to prevent a beam reflected at the WBG 555 from being reflected at the opposite end of the PLC waveguide 560. Since a phase-matching condition between the two waveguides 526 and 560 can be satisfied by properly using the down-tapered PLC waveguide structure 562, an optical coupling efficiency between the two waveguides 526 and 560 can be increased.

A refractivity of the InP waveguide 526 is at most two times lager than a refractivity of the PLC waveguide 560, which uses the silica or polymer substance. When a refractivity difference between the InP waveguide 526 and the PLC waveguide 560 is large, since a directional coupler transferring an optical power by permitting one waveguide to approach another waveguide cannot satisfy the phase-matching condition, an optical transfer effect is low. In order to solve this problem, a leaky-mode grating-assisted directional coupler (LM-GADC) 545 satisfying the phase-matching condition between two waveguides by carving gratings on a coupled surface between the Passive waveguide 526 and the PLC waveguide 560 is suggested as shown in FIG. 5A.

The WBG 555 is formed on the PLC waveguide 560, and a heater terminal 550 is installed above the WBG 555 to control a temperature of the WBG 555. The wavelength-tunable WBG 555 is formed by the temperature control using the heater 550.

The contents related to FIG. 5A are disclosed in U.S. Pat. No. 6,236,773 (Single Wavelength Semiconductor Laser with Grating-assisted Dielectric Waveguide Coupler, Texas Instruments Incorporated).

Referring to FIG. 5B, FIG. 5B illustrates an etched surface-mount coupling (ESMC) method of etching a portion of the InP chip 520 and forming the Passive waveguide 526 using a dielectric material 525 having a refractivity similar to a refractivity of a PLC. The other parts refers to the description of FIG. 5A.

Figure 6A:
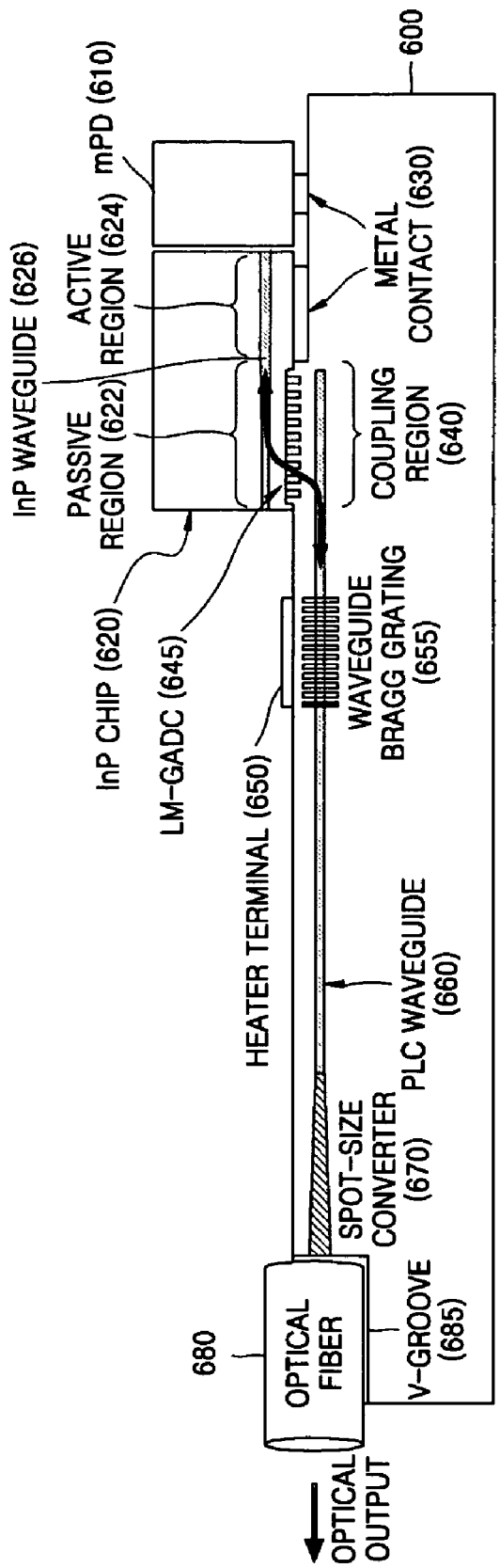
FIGS. 6A and 6B are side views of an embodiment of an ONT-TOSA, a wavelength of which is tunable by changing temperature, based on a vertically coupled ECL.
Figure 6B:
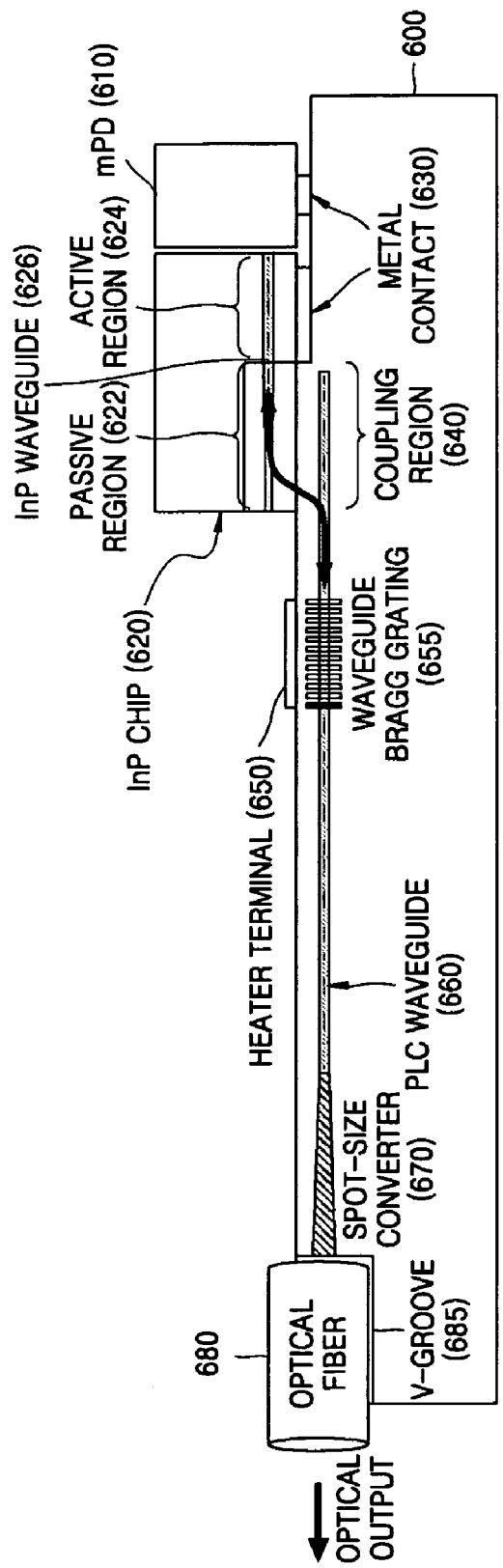

FIGS. 6A and 6B are side views of an embodiment of an ONT-TOSA, a wavelength of which is tunable by changing temperature, based on a vertically coupled ECL.

FIG. 6A shows an example using the LM-GADC method described in FIG. 5A, and FIG. 6B shows an example using the ESMC method described in FIG. 5B.

Referring to FIGS. 6A and 6B, unlike a conventional butt coupling method of directly coupling an active region 624 of an InP chip 620 generating light and a WBG 655 on a straight line, the active region 624 and the WBG 655 exist on different waveguides and are vertically coupled. Accordingly, a degree of difficulty of fabrication can be lowered, and simplicity of the fabrication process can be improved.

An mPD 610 is installed at a location close to the InP chip 620 in order to monitor an optical power of light generated in the active region 624. The WBG 655 is formed on a PLC waveguide 660, and a heater 650 is installed above the WBG 655 to control a temperature of the WBG 655. Temperature of the wavelength-tunable WBG 655 is controlled the heater 650. A spot-size converter 670 for magnifying a beam size in the PLC waveguide 660 is formed at a location coupled to an optical fiber 680 in order to increase an optical coupling efficiency between the PLC waveguide 660 and the optical fiber 680. The optical fiber 680 is installed by being passive-aligned into a V-groove 685 formed on the PLC. Accordingly, an alignment process is simplified.

The WBG 655 fabricated using a silica material waveguide can have an optical wavelength variation range of around 2 nm in response to the variance of its temperature of 200° C. However, as for using this as a WDM wavelength-tunable light source, it is uneconomical since the number of channels is too small (for example, two channels are generated at 200 GHz spacing). On the other hand, since the WBG 655 fabricated using a polymer material waveguide can have an optical wavelength variation range of at most 30 nm in response to the variance of ambient temperature of 200° C., it is economical in terms of the number of channels (for example, eighteen channels can be generated at 200 GHz spacing).

The other parts of FIGS. 6A and 6B refer to the description of FIGS. 5A and 5B.

Figure 7A:
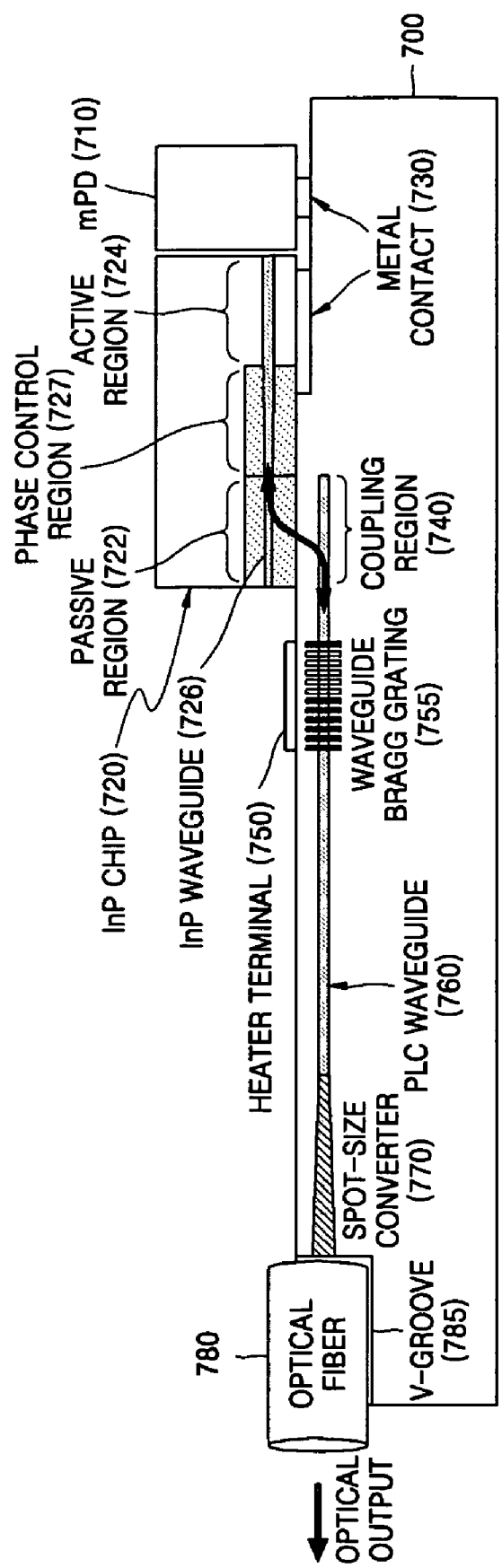
FIGS. 7A and 7B are side views of another embodiment of an ONT-TOSA, a wavelength of which is tunable by changing temperature, based on a vertically coupled ECL.
Figure 7B:
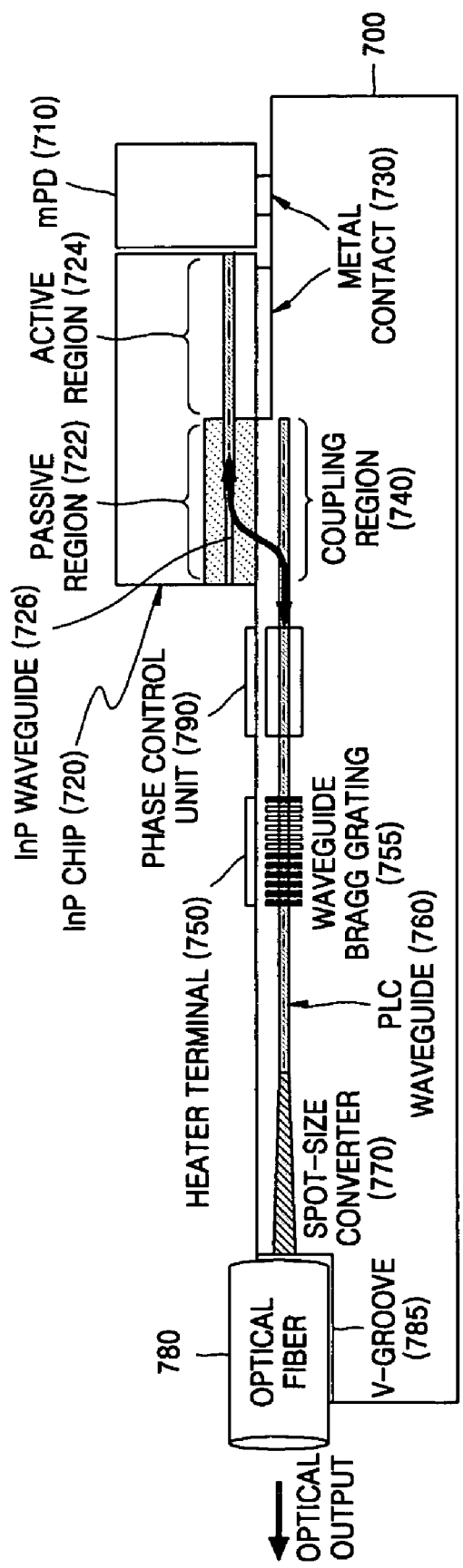

FIGS. 7A and 7B are side views of another embodiment of an ONT-TOSA, a wavelength of which is tunable by changing temperature, based on a vertically coupled ECL.

Referring to FIG. 7A, a basic structure is equal to the structure of FIG. 6B except a phase control region 727 inserted for a fine tuning and a stable operation of a resonant wavelength. FIG. 7A shows a side view of the ONT-TOSA in which the phase control region 727 is integrated in an InP chip 720. Here, a phase control is performed by controlling an amount of a current supplied to the phase control region 727.

Referring to FIG. 7B, a basic structure is equal to the structure of FIG. 6B except a phase control unit 790, which is located at a PLC waveguide 760, inserted for a fine tuning and a stable operation of an resonant wavelength. Here, a phase control is performed by using an electro-optic effect or a thermo-optic effect.

The other parts of FIGS. 7A and 7B refer to the description of FIGS. 5A, 5B and 6B.

Figure 8A:
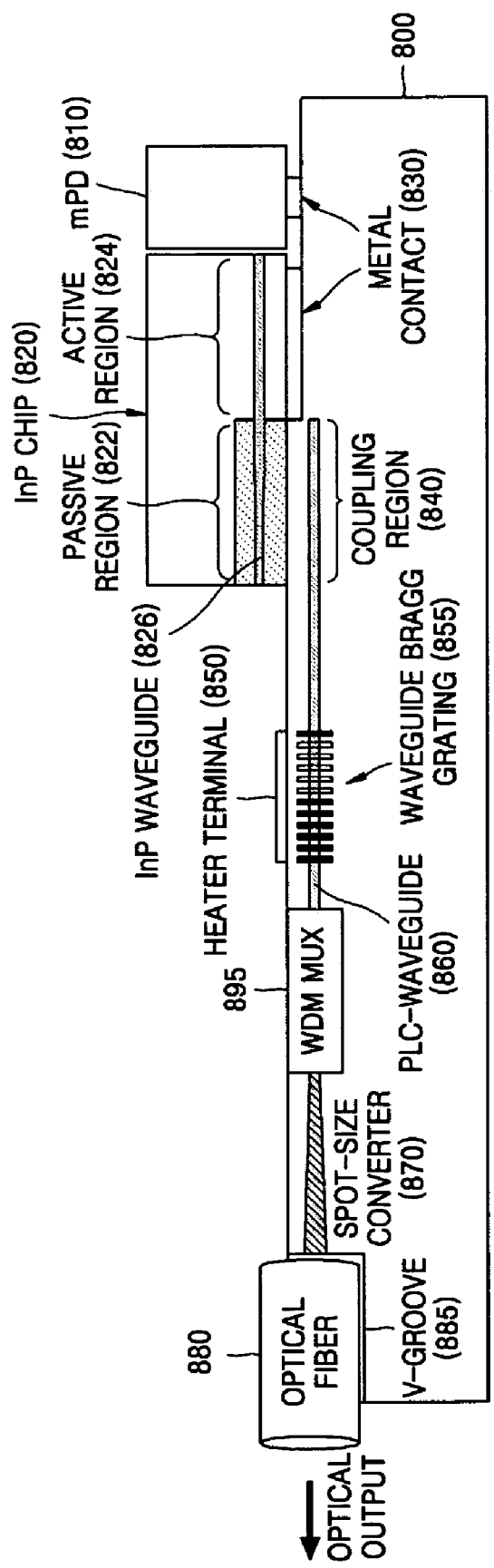
FIGS. 8A and 8B are a top view and a side view of an embodiment of an OLT-TOSA, a wavelength of which is tunable by changing temperature, based on a vertically coupled ECL.
Figure 8B:
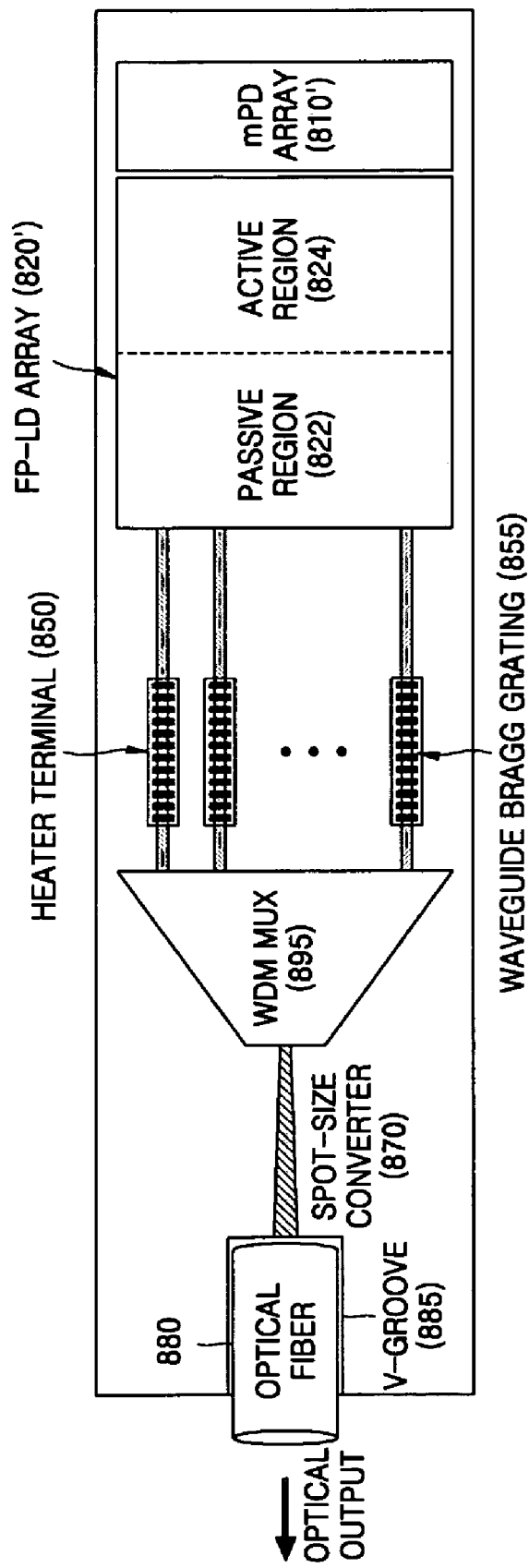

FIGS. 8A and 8B are a top view and a side view of an embodiment of an OLT-TOSA, a wavelength of which is tunable by changing temperature, based on a vertically coupled ECL.

Referring to FIGS. 8A and 8B, an FP-LD array 820' forms an ECL array by aligning one to one to a WBG array having reflection bands with frequency spacings recommended by ITU-T. In each ECL, a center wavelength of a relevant WBG reflection band is set so that a WDM optical signal with a predetermined frequency spacing can be transmitted.

By the WBG array permitting a wavelength of each WBG 855 to independently vary according to a thermo-optic effect, a yield against a fabrication error of a WBG 855 is dramatically improved, and a wavelength alignment according to the variance of WBG temperature is possible.

Multi-wavelength optical signals output from the output ends of the ECL array are finally output by being wavelength-multiplexed by a WDM MUX 895 monolithically integrated on one PLC chip. An optical fiber pigtail process of the OLT-TOSA can be simplified to single pigtail by integrating the ECL array and the WDM MUX 895 on the same PLC. An arrayed-waveguide grating (AWG) and a WDM filter can be used for the WDM MUX 895.

A semiconductor chip generating light is fabricated as the FP-LD array 820' bar as shown in FIGS. 8A and 8B. Here, if individual FP-LD chips are used for respective ECLs, a process time is much longer when a passive alignment using a flip-chip bonding method is performed for all the FP-LD chips, and the alignment of already bonded chips may be distracted when other chips are aligned. These problems are solved using the FP-LD array 820' chip bar shown in FIGS. 8A and 8B. An mPD 810 is also fabricated as an mPD array 810' and monitors an optical output power of each ECL.

Figure 9A:
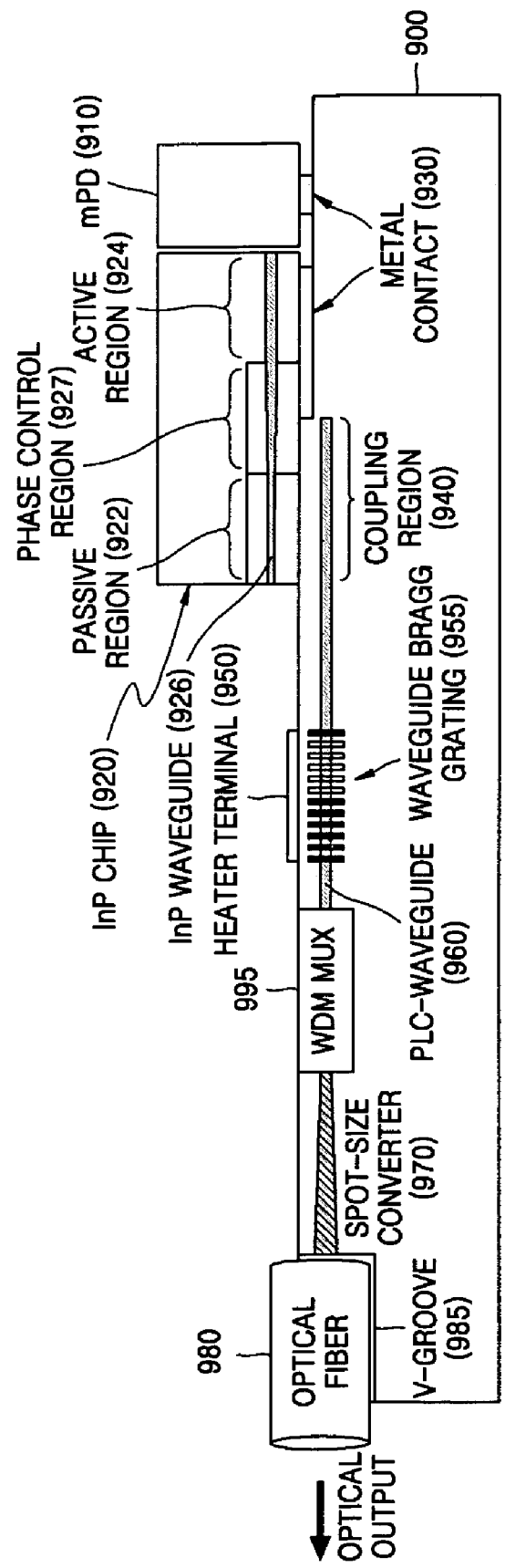
FIGS. 9A and 9B are a top view and a side view of another embodiment of an OLT-TOSA, a wavelength of which is tunable by changing temperature, based on a vertically coupled ECL.
Figure 9B:
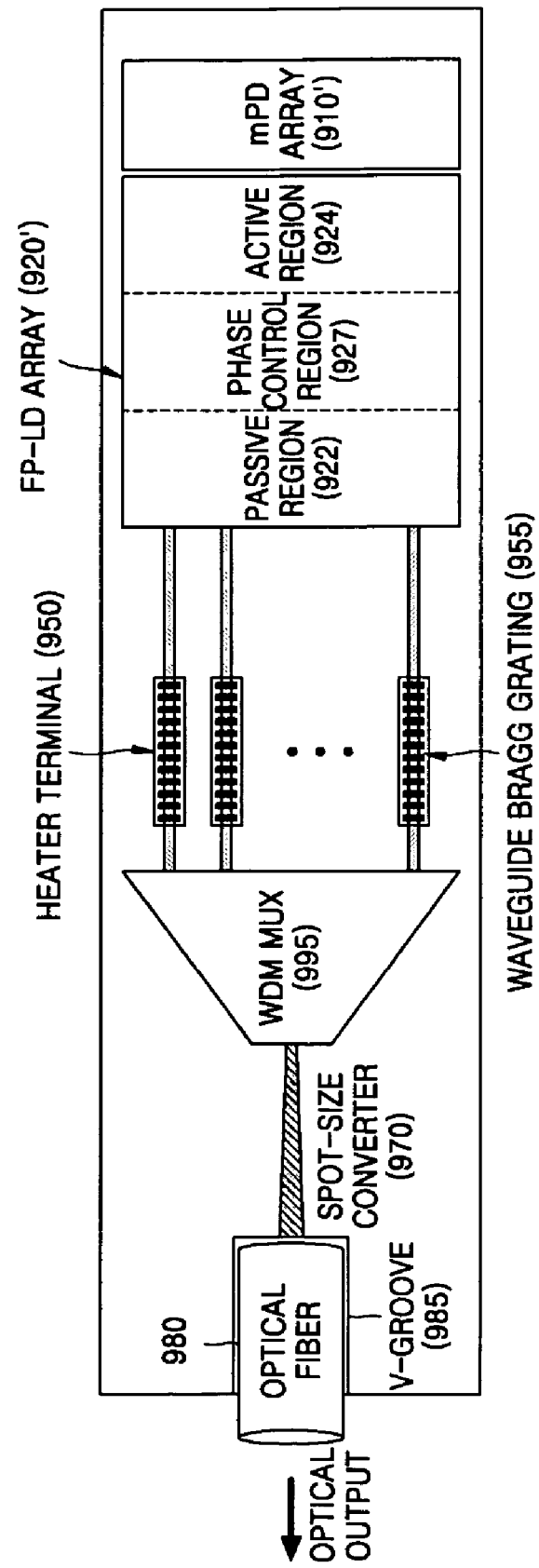

FIGS. 9A and 9B are a top view and a side view of another embodiment of an OLT-TOSA, a wavelength of which is tunable by changing temperature, based on a vertically coupled ECL.

A basic structure of FIG. 9A is equal to the structure of FIG. 8A except a phase control region 927 inserted for a fine tuning and a stable operation of a wavelength.

Referring to FIGS. 9A and 9B, a basic structure is equal to the structure of FIGS. 8A and 8B except a phase control region 927 inserted for a fine tuning and a stable single mode operation. FIG. 9A shows a side view of the OLT-TOSA in which the phase control region 927 is integrated in an InP chip 920. Here, a phase control is performed by controlling an amount of a current supplied to the phase control region 927.

Figure 10:
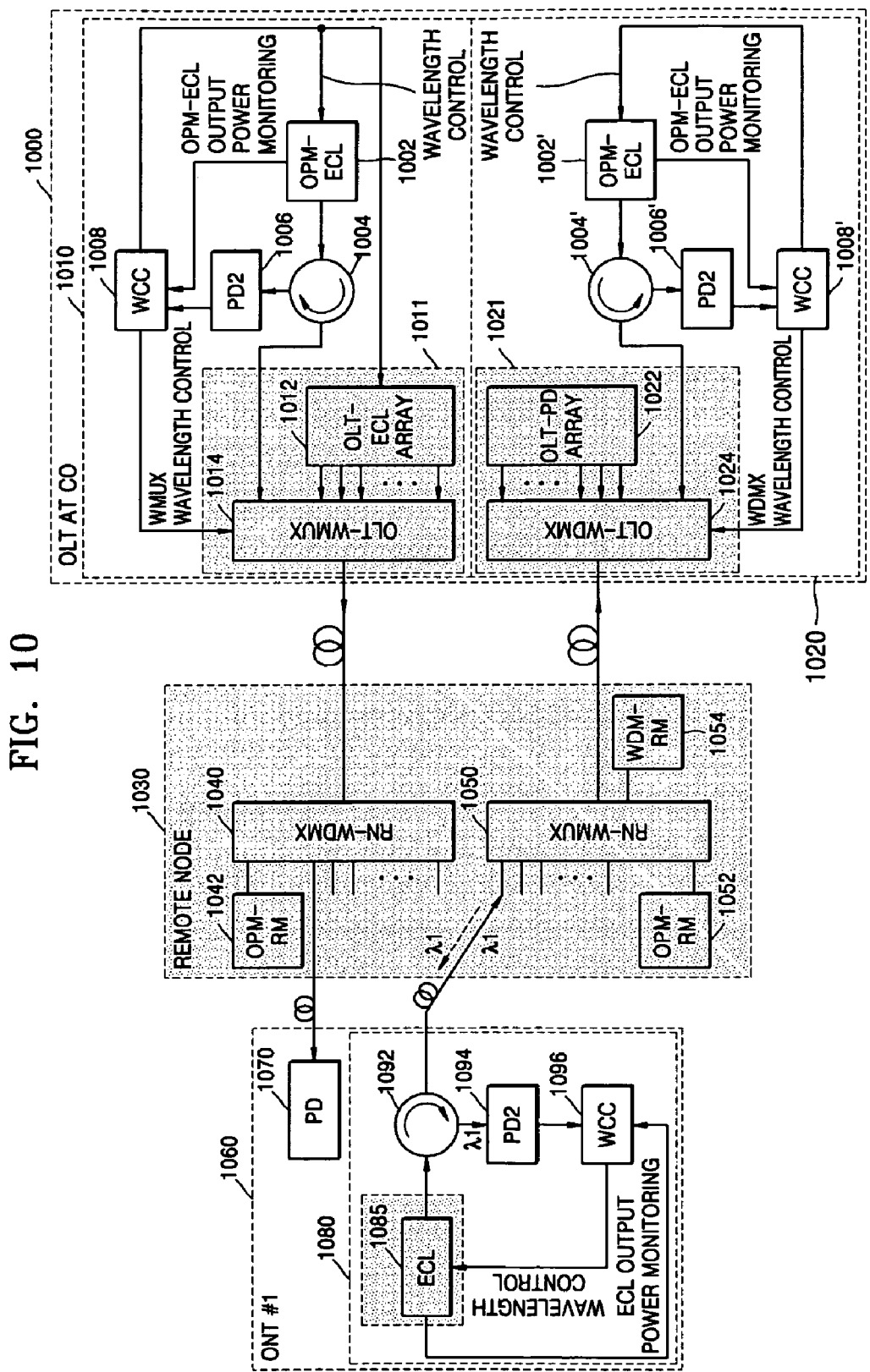
FIG. 10 is a block diagram illustrating a logical structure of a WDM-PON according to another embodiment of the present invention.

FIG. 10 is a block diagram illustrating a logical structure of a WDM-PON according to another embodiment of the present invention.

Referring to FIG. 10, OSAs configuring a suggested WDM-PON are shown. There are four kinds of OSAs, such as an ONT-TOSA 1085 for an ONT 1060, an OLT-TOSA 1011 for an OLT transmitter 1010, an OLT-receiver OSA (ROSA) 1021 for an OLT receiver 1020, and an RN-WMUX/WDMX 1030 located near subscribers.

If these four kinds of OSAs are fabricated with a PLC, since optical communication parts of the suggested WDM-PON system are configured with 4 chips, the suggested WDM-PON system has advantages in terms of a physical volume and mass production. As different things from FIG. 2, the OLT-LD array 202 of FIG. 2 is substituted with an OLT-ECL array 1012, and the ONT-LD 285 is substituted with an ECL 1085. Also, the OPM-LDs 212 and 222 generating light for alignment of wavelengths of the optical transmitter 210 and of the optical receiver 220 in FIG. 2 are substituted with OPM-ECLs 1002 and 1002' of FIG. 10. The other parts refer to the description of FIG. 2.

As described above, the present invention relates to a WDM-PON with an optical wavelength alignment function for maintaining optical communication links regardless of ambient temperature changes. Since a function of maintaining stable optical communication links regardless of ambient temperature changes is necessary when a WDM-PON is applied to an actual environment, a WDM-PON system having a function of realizing a cost-effective optical wavelength alignment according to an embodiment of the present invention can solve this problem.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A PLC-based wavelength-tunable WDM-PON system with an optical wavelength alignment function, the WDM-PON system comprising:
   a PLC platform;
   a semiconductor chip comprising an active region generating light and a passive region located in front of the active region using a directional coupling principle for vertically coupling the light generated in the active region to another waveguide;
   a planar lightwave circuit (PLC) waveguide is formed on the PLC platform, and in one portion of which a PLC platform semiconductor chip is surface mounted by a passive alignment method, and at a predetermined location of PLC waveguide a waveguide Bragg grating (WBG) is formed;
   a directional coupler transferring an optical power by permitting the passive region to approach the PLC waveguide;
   a heater terminal, which is formed on the WBG in order to control a temperature of the WBG; and
   a V-groove, which is formed on the PLC platform for attaching an optical fiber into the end of the PLC waveguide.

2. The WDM-PON system of claim 1, wherein the directional coupler uses a leaky-mode grating-assisted directional coupling (LM-GADC) method for optical power transfer between two waveguides by carving gratings on a coupled surface between the semiconductor chip waveguide and the PLC waveguide.

3. The WDM-PON system of claim 1, wherein the directional coupler uses an etched surface-mount coupling (ESMC) method of etching a portion of the semiconductor chip and forming the a waveguide using a dielectric material having a refractivity similar to a refractivity of the PLC waveguide.

4. The WDM-PON system of claim 1, wherein the size of the semiconductor chip waveguide is getting smaller from the start of passive region to the waveguide end in order to increase optical coupling efficiency between the semiconductor chip waveguide and the PLC waveguide.

5. The WDM-PON system of claim 4, wherein the passive region has a structure of transferring a beam generated in the active region to the PLC waveguide before the beam generated in the active region reaches of the end of the passive region.

6. The WDM-PON system of claim 1, wherein the PLC waveguide is formed with a structure that the size of the PLC waveguide is getting smaller from a portion coupled to the passive region to one end of the PLC waveguide in order to increase an optical power coupling efficiency between the passive waveguide and the PLC waveguide and does not permit a beam reflected by the WBG to be reflected at the one end of the PLC waveguide.

7. The WDM-PON system of claim 1, wherein an mPD monitoring the intensity of a beam generated by the semiconductor chip is installed next to the semiconductor chip.

8. The WDM-PON system of claim 1, wherein the PLC waveguide is formed with a spot-size converter structure in which a beam size in the PLC waveguide is enlarged in order to increase an optical coupling efficiency between the PLC waveguide and the optical fiber.

9. The WDM-PON system of claim 1, wherein the optical fiber is passive-aligned into V-groove formed on the PLC platform.

10. The WDM-PON system of claim 1, wherein the semiconductor chip further comprises: a phase control region performing a fine tuning of a wavelength, and the fine tuning of the wavelength is performed by controlling an amount of a current supplied to the phase control region.

11. The WDM-PON system of claim 1, wherein the PLC waveguide further comprises: a phase control region performing a fine tuning of a wavelength, and the fine tuning of the wavelength is achieved by an electro-optic effect or a thermo-optic effect of the PLC waveguide.

12. The WDM-PON system of claim 1, wherein the semiconductor chip is composed of an FP-LD array, and the FP-LD array forms an ECL array by aligning one to one to a WBG array.

13. The WDM-PON system of claim 12, wherein the WBG array permits a wavelength of each WBG to independently vary according to a thermo-optic effect.

14. The WDM-PON system of claim 12, wherein mPDs monitoring beams output from the FP-LD array are configured in an mPD array bar.

15. The WDM-PON system of claim 12, wherein the number of optical fiber pigtails is one by multiplexing multi-wavelength optical signals output from the output ends of the ECL array by a WDM MUX monolithically integrated on the PLC platform.

* * * * *